United States Patent
Mason

(10) Patent No.: US 10,781,378 B2
(45) Date of Patent: Sep. 22, 2020

(54) COMPOSITIONS AND METHODS FOR DISSOLUTION OF HEAVY ORGANIC COMPOUNDS

(71) Applicant: FQE CHEMICALS INC., Calgary (CA)

(72) Inventor: Douglas J. Mason, Ridgway, CO (US)

(73) Assignee: FQE CHEMICALS INC., Edmonton, AB (*) Notice: Subject to any disclaimer, the term of this patent is extended or adjusted under 35 U.S.C. 154(b) by 169 days.

(21) Appl. No.: 15/831,878

(22) Filed: Dec. 5, 2017

(65) Prior Publication Data

US 2019/0169511 A1   Jun. 6, 2019

(51) Int. Cl.
*C09K 8/52* (2006.01)
*C10G 29/28* (2006.01)
*C10G 29/20* (2006.01)
*C09K 8/524* (2006.01)

(52) U.S. Cl.
CPC .............. *C10G 29/28* (2013.01); *C09K 8/524* (2013.01); *C10G 29/205* (2013.01); *C10G 2300/1085* (2013.01); *C10G 2300/206* (2013.01)

(58) Field of Classification Search
CPC ................................. C09K 8/52; C09K 8/524
USPC ....................................................... 208/48 R
See application file for complete search history.

(56) References Cited

U.S. PATENT DOCUMENTS

| | | |
|---|---|---|
| 3,224,957 A | 12/1965 | Kent |
| 3,930,539 A | 1/1976 | Curtis |
| 4,278,129 A | 7/1981 | Walton |
| 4,379,490 A | 4/1983 | Sharp |
| 4,414,035 A | 11/1983 | Newberry et al. |
| 4,441,890 A * | 4/1984 | Feldman ............... C10L 1/2437 44/281 |
| 4,477,337 A | 10/1984 | Ronden et al. |
| 4,704,225 A | 11/1987 | Stoufer |
| 4,813,482 A | 3/1989 | Walton |
| 4,836,286 A | 6/1989 | Edwards |
| 5,021,498 A | 6/1991 | Stephenson et al. |
| 5,143,594 A | 9/1992 | Stephenson et al. |
| 5,202,056 A | 4/1993 | Sung et al. |
| 5,425,422 A | 6/1995 | Jamaluddin et al. |
| 5,504,063 A * | 4/1996 | Becker ................... C09K 8/524 134/40 |
| 5,559,085 A | 9/1996 | Duncan |
| 5,690,176 A | 11/1997 | Delbianco et al. |
| 5,909,774 A | 6/1999 | Griffith et al. |
| 6,051,535 A * | 4/2000 | Bilden ................... C09K 8/524 166/304 |
| 6,063,146 A | 5/2000 | Miller et al. |
| 6,112,814 A | 9/2000 | Chan et al. |
| 6,180,683 B1 | 1/2001 | Miller et al. |
| 6,204,420 B1 | 3/2001 | Miller et al. |
| 6,313,367 B1 | 11/2001 | Breen |
| 6,368,422 B1 | 4/2002 | Breuer et al. |
| 6,488,724 B1 | 12/2002 | Hertel et al. |
| 6,593,279 B2 | 7/2003 | Von Krosigk et al. |
| 6,946,524 B2 | 9/2005 | Breuer et al. |
| 7,097,759 B2 | 8/2006 | Mukkamala et al. |
| 7,122,112 B2 * | 10/2006 | Mukkamala ............ C10G 9/16 208/48 AA |
| 7,122,113 B2 | 10/2006 | Cornelisse et al. |
| 7,296,627 B2 | 11/2007 | Dyer |
| 7,497,261 B2 | 3/2009 | Dyer |
| 7,632,785 B2 | 12/2009 | Dyer |
| 7,670,993 B2 | 3/2010 | Dyer |
| 7,712,533 B2 | 5/2010 | Qu et al. |
| 7,754,657 B2 | 7/2010 | Trimble et al. |
| 7,976,640 B2 | 7/2011 | Meyer et al. |
| 8,177,960 B2 | 5/2012 | Rouet et al. |
| 8,691,731 B2 | 4/2014 | Jennings et al. |
| 8,695,707 B2 | 4/2014 | Li et al. |
| 8,778,850 B2 | 7/2014 | Andrecola |
| 9,074,121 B2 | 7/2015 | Dyer |
| 9,120,978 B2 | 9/2015 | Mazyar et al. |
| 9,221,803 B2 | 12/2015 | Mena Cervantes et al. |
| 9,404,344 B2 | 8/2016 | Milam et al. |
| 9,416,627 B2 | 8/2016 | Dyer |
| 9,586,915 B2 | 3/2017 | Hernandez Altamirano et al. |
| 10,435,618 B2 * | 10/2019 | Ravikiran ............... C09K 8/584 |
| 10,436,691 B2 * | 10/2019 | Fouchard ................. G01N 5/00 |
| 2006/0142172 A1 | 6/2006 | Cioletti et al. |
| 2010/0130389 A1 | 5/2010 | Lightford et al. |

(Continued)

FOREIGN PATENT DOCUMENTS

| | | |
|---|---|---|
| CA | 20092709332 A1 | 6/2009 |
| FR | 19932679151 A1 | 1/1993 |
| WO | 2008024488 A2 | 2/2008 |

OTHER PUBLICATIONS

O.H. Elochukwu and Hisham K.B. Mahmud, An Environmentally Friendly Solvent Mix for Asphaltene Deposit Removal, ARPN Journal of Engineering and Applied Sciences, vol. 10, No. 22, 2015.

Kelland M., Production Chemicals for the Oil and Gas Industry, Chapters 4.1 and 4.2 pp. 111-144, CRC Press-Taylor & Fransis Group, 2014.

Sara M. Hashmi and Abbas Firoozabadi, Self-Assembly of Resins and Asphaltenes Facilities Asphaltene Dissolution by Organic Acid, Journal of Colloid and Interface Science 394: 115-123, 2013.

(Continued)

*Primary Examiner* — Ellen M McAvoy

(74) *Attorney, Agent, or Firm* — Field LLP

(57) ABSTRACT

A composition is provided for chemically liquefying and dispersing heavy organic solids in hydrocarbon streams. The composition comprises oxyalkylated tertiary dodecyl mercaptan; alkylaryl sulfonic acid or its representative salts; alkyl di-substituted 9-decenamide; and a hydrocarbon distillate.

22 Claims, No Drawings

(56) References Cited

U.S. PATENT DOCUMENTS

| | | | |
|---|---|---|---|
| 2010/0282467 A1* | 11/2010 | Hutchison | C07C 303/06 |
| | | | 166/305.1 |
| 2010/0314117 A1* | 12/2010 | Li | C09K 8/524 |
| | | | 166/307 |
| 2012/0220807 A1 | 8/2012 | Miller | |
| 2014/0260567 A1* | 9/2014 | Fouchard | G01N 33/2835 |
| | | | 73/61.62 |
| 2014/0357532 A1 | 12/2014 | Sarda et al. | |
| 2015/0011453 A1* | 1/2015 | Bennett | C11D 3/2006 |
| | | | 510/402 |
| 2015/0240142 A1* | 8/2015 | Kefi | C09K 8/42 |
| | | | 507/135 |
| 2017/0058185 A1* | 3/2017 | Naumov | C09K 8/524 |
| 2018/0010032 A1* | 1/2018 | Barral | C09K 8/40 |

OTHER PUBLICATIONS

Chia-Lu Chang and H.S. Fogler, Asphaltene Stablization in Alkyl Solvents Using Oil-Soluble Amphiphiles, SPE Symposium on Oilfield Chemistry held in New Orleans, LA, USA Mar. 2-5, 1993 Paper No. 25185.

M.N. Bouts, R.J. Wiersma, H.M. Muijs, A.J. Samuel, An Evaluation of New Asphaltene Inhibitors; Laboratory Study and Field Testing, Journal of Petroleum Technology, #47, 782-7, 1995.

\* cited by examiner

COMPOSITIONS AND METHODS FOR DISSOLUTION OF HEAVY ORGANIC COMPOUNDS

FIELD OF THE INVENTION

The present invention relates to compositions for the dissolution of heavy organic compounds and methods for using the same.

BACKGROUND

Deposition of high molar weight, heavy organic compounds from crude petroleum production and processing has plagued the oil industry for many years. As the world's supply of lighter crude oil is depleted, heavier oils with increasingly higher amounts of heavy organics in the form of waxes, resins, maltenes and asphaltenes are being produced and subsequently processed through refining operations. The presence of such compounds result in precipitation out of the crude oils due to various forces, and cause blockage in the oil reservoir, in pipelines transporting the produced oils, in shipping compartments, in storage vessels that hold the crude supplies and in processing operational facilities.

The increasingly larger amounts of heavy organic materials present in crude oil supplies represents larger amounts of lost production revenues in that this portion of a barrel of oil is often disposed of as waste through maintenance operations to clean storage tanks, pig pipelines, clean-out downhole tubulars, clean desalters, columns and towers in refineries as well as ship compartments. The cost to mechanically and/or chemically remove the heavy organic residues is a significantly large expense costly petroleum production and refining operations hundreds-of-millions of dollars each year.

Asphaltene are organic solids consisting of various polyaromatic structures with aliphatic chains containing heteroatoms such as sulfur, nitrogen, and oxygen, and metals such as nickel, vanadium and iron. The metals form complexes and impart electrical charge, which may influence asphaltene deposition. Resin and maltene precursors of the asphaltenes act as peptizing agents in virgin crude oils to stabilize a dispersion of micelles. When mechanical or chemical forces become sufficiently great, these stabilizing agents are lost and the destabilized asphaltenes become susceptible to interaction and aggregation resulting in deposition of asphaltene macro-particles.

Asphaltene precipitation occurs when there is destabilization of the thermodynamic equilibrium that exists in crude oil. Changes in composition, temperature and pressure are the three main factors responsible for the thermodynamic equilibrium destabilization. These phenomenon causes asphaltene to grow in size from nano-scale to micro-scale in a stage referred to as asphaltene precipitation. Flocculation occurs when the precipitated asphaltene begins to attract each other and aggregate thereby forming particles of larger sizes. The large sized asphaltene particles drop out as their weight could no longer be supported in the crude oil and therefore, deposit on metal surfaces or in the porous media.

Asphaltene deposits are hard, amorphous, high melting, adherent materials that are difficult to remove by mechanical methods, and washing with conventional solvents or hot well fluids is ineffective in their removal. Asphaltenes with their aromatic ring structure may be dissolved with aromatic solvents like xylene and toluene and in highly aromatic well fluids, but they are substantially insoluble in paraffinic well fluids and straight chain alkanes such as hexane, heptane and the like. A variety of chemical treatments are disclosed in the art for removing asphaltenes including the use of solvents, combinations of dispersants and solvents, and compositions comprising oil, dispersants and solvents. Diesel oil, by itself and in combination with certain additives, has been disclosed to dissolve asphaltenes. For example, the combination of diesel oil and 1% n-butylamine is disclosed to be substantially superior to diesel oil alone with respect to dissolving asphaltenes.

Small amounts of dispersing agents may be effective to prevent or reduce the precipitating-out of asphaltenes, or to reduce the tendency of such precipitates to become deposited on surfaces. A variety of compounds suitable for use as asphaltene-dispersing agents are known, including dodecylbenzenesulfonic acid, alkane sulfonic acids, and alkoxylated amines, and their use in such applications is widely described in the art. Dispersants and emulsifiers employing compositions of alkoxylated fatty amines and metallic soaps, and dispersants comprising alkylphenol-formaldehyde resins in combination with hydrophilic-lipophilic vinyl polymers are also known to be suitable for these purposes.

The dispersant materials disclosed to date only partly solve the problem presented by the precipitation of asphaltenes in processing equipment, storage containers and production operations. As crude oil supplies vary in their composition, individual dispersants can only act effectively in a restricted range. Therefore, the known dispersant properties of well-established materials such as cited above, and others are not satisfactory for use in a broad application and additional innovative technologies are required.

Hydrocarbon-based solvents, like xylene or xylene compositions, are the most commonly used for dissolution of deposited asphaltenes. While such treatments are effective, they present problems with respect to health, safety, and environmental (HSE) characteristics (lower flash points and the presence of benzene, ethyl benzene, toluene, or xylene (BETX) components), which can limit their use. In addition, asphaltenes solubilized by aromatic solvents may re-precipitate elsewhere in the formation.

U.S. Pat. No. 9,120,978 (Mazyar et al., 2015) teaches using an intercalating agent to decompose asphaltene particles, the intercalating agent comprising: pyrophosphoric acid ($H_4P_2O_7$), an organometallic compound that includes a metallocene, metal carbonyl, or a combination comprising at least one of the foregoing, a metal selected from the group consisting of an alkali metal, and alkaline earth metal, a binary alloy of an alkali metal with mercury or thallium, a ternary alloy of an alkali metal with a Group V metal or a metal coordinated by nitrogenous compounds.

U.S. Pat. No. 9,416,627 (Dyer, 2016) and U.S. Pat. No. 9,074,121 (Dyer, 2015) teach methods for cleaning oil wells by use of a cleaning emulsion comprising of water, hydrocarbon solvent, terpene hydrocarbon material, demulsifier, detergent, and optionally an acid.

U.S. Pat. No. 8,691,731 (Jennings et al., 2014) uses heat of exothermic reaction between unsaturated compound (such as terpene) and acid (such as sulfonic, sulfuric or nitric acid) to melt and subsequently disperse the deposits including asphaltene.

U.S. Pat. No. 7,754,657 (2010, Trimble et al.) employs compositions comprising from at least one C4-C30 olefin or oxidation product and kerosene or an aromatic solvent.

U.S. Pat. No. 8,695,707 (Li et al., 2014) relates to compositions and methods of removing an organic deposit comprising at least two non-polar organic solvents and at least two polar organic solvents. The non-polar organic solvents comprise aromatic naphtha, terpenes, kerosene, and combination thereof, and the polar solvents comprise heavy aromatic naphtha, cyclohexanone, N-2-methyl pyrrolidone, N-ethyl-2-pyrrolidone, and combination thereof.

US 20060142172 (Cioletti et al., 2006) teaches a method for removing oils, paraffins, and asphaltene deposits using a composition of organic solvents where the composition comprises reduced naphthalene aromatic solvents, aliphatic petroleum distillates and normal and cycloaliphatic naphtha, a fatty acid alkyl ester blend, surfactant, terpenes, terpene alcohols, $C_8$-$C_{14}$ alcohol acetate ester blends, glycols, diacid esters and n-methyl 2 pyrolidone and alkylene glycol alkyl ether.

US 20100130389 A1 (Lightford et al., 2010) teaches a composition for removing an organic material from a wellbore tubular, fracture system comprising water, an organic solvent blend further comprising non-polar and polar organic solvents.

WO 2008024488 A2 (Acunto, 2008) claims a combination of terpene (d-limonene) and a hydrocarbon solvent to dissolve wax and asphaltene.

U.S. Pat. No. 8,177,978 (Rouet et al. 2012) uses chlorophyll extracted from green leaf treated with copper nitrate and synergized with methyl ester of oleic acid to disperse asphaltene.

US 20140357532 A1 (Sarda et al., 2014) teaches composition for inhibiting the precipitation of asphaltene or paraffin and for dissolving asphaltene or paraffin. The composition includes: an aliphatic compound, an alpha-olefins, and camphor.

U.S. Pat. No. 9,404,344 Milam et al. (2016) teaches asphaltene solvent (dissolution) using dimethyl sulfide solution of at least 75 mol % and up to 25 mol % of a decant oil.

U.S. Pat. No. 9,586,915, (Hernandez Altamirano, et al. 2017) provides base compounds including 1,3-oxazinan-6-one derivatives of N-alkyl or N-alkenyl or N-cycloalkyl or N-aryl propionic acids and paraformaldehyde to function as corrosion inhibitors for ferrous metals and as inhibitors or dispersants of asphaltenes.

SUMMARY

A composition is provided for chemically liquefying and dispersing heavy organic solids in hydrocarbon streams. The composition comprises oxyalkylated tertiary dodecyl mercaptan; alkylaryl sulfonic acid or its representative salts; alkyl di-substituted 9-decenamide; and a hydrocarbon distillate.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

DETAILED DESCRIPTION OF VARIOUS EMBODIMENTS

The description that follows and the embodiments described therein are provided by way of illustration of an example, or examples, of particular embodiments of the principles of various aspects of the present invention. These examples are provided for the purposes of explanation, and not of limitation, of those principles and of the invention in its various aspects.

The present invention provides compositions and methods by which to recover crude oil heavy organic solids in the form of asphaltenes, maltenes, resins and waxes that are often and typically lost through precipitation during production, transportation, storage and processing activities. More specifically, the present invention provides a means by which to recover these otherwise waste hydrocarbon products for use as a fuel/energy source and to reduce environmental disposal quantities. Further, the present invention provides compositions and methods by which to stabilize large hydrocarbon compounds, more specifically asphaltenes/maltenes, for extended periods of time of 1 year and longer without significant precipitation or re-deposition within transportation vessels, pipelines, storage tanks or other processing equipment.

It has been discovered that compositions of di-substituted 9-decenamide, oxyalkylated dodecyl mercaptans in conjunction with alkyl aryl sulfonic acids, and their salts, can be used to enhance the rate of dissolution of accumulated deposits of heavy organic solids in equipment, pipes of vessels that have been fouled with such heavy organic solids. The composition of these active ingredients can also greatly extend the term of dispersion of heavy organic solids such as asphaltenes, maltenes and other heavy organic solids.

The active ingredients listed above are oil-soluble goods and can be presented dissolved in an oil-soluble solvent system such as a selected hydrocarbon distillate. Some types of hydrocarbon distillate may also have a functional purpose in aiding with the dissolution of the foulants.

The present composition can be diluted in a further hydrocarbon base liquid that acts a vehicle to carry the composition and hydrocarbon distillate through the vessels, pipelines or equipment to be treated. The dilution is typically done on site with any hydrocarbon base liquid available at the site of the vessels, pipelines or equipment to be treated. As an example, the hydrocarbon base liquid can be diesel oil, (atmospheric gas oil, light or heavy vacuum gas oil, light cycle oil and some crude oils with API gravity of a minimum of 25. The present composition is typically diluted to concentrations of less than 10%, and more preferred concentration of less than 7% and most preferred concentration range of 2.5-5.0%, in the hydrocarbon base liquid.

The present compositions, in addition to dissolving heavy organic solids that foul equipment, can also act as a preventive against re-precipitation and re-deposition in production equipment, storage and transportation vessels, pipelines and in oil bearing formations.

In a preferred embodiment, the oxylated dodecyl mercaptans are oxyalkylated tertiary dodecyl mercaptans having an oxide adduct ranging from 4-10 moles of ethylene oxide, and more preferably between 6 to 8 moles of ethylene oxide. Preferably, the oxyalkylated tertiary dodecyl mercaptan is added to the present composition at a concentration ranging from 1.0-10% by wt., and more preferably from 1.0-2.0% by wt.

The alkylaryl sulfonic acid and or its representative salts more preferably comprises an alkyl group ranging from 8-16 carbon atoms in either linear or branch form, and more preferably with an alkyl group containing 12 carbon atoms. The alkylaryl sulfonic acid can be in acid form or as a neutralized salt of sodium, potassium or selected amines such as isopropylamine. The alkylaryl sulfonic acid or its salts are preferably added in to the present composition in concentrations ranging from 0.5-5.0% by wt. and more preferable from 0.5-2.0% by wt.

The alkyl di-substituted 9-decenamide is preferably substituted with substitutions selected from the following groups; dimethyl, dimethyl 1-3 oxo, Cis-9-10 Octa, (Z) Octa, 4-hydroxy-3-methoxyphenyl, 2-methyl-3,8-dioxa. More preferably the di-substitution is in the form of dimethyl groups on the terminal nitrogen. The di-substituted 9-decenamide is preferably added to the present composition in concentrations ranging from 2.0-20.0% by wt.

In the present composition, which can be considered a chemical diluent system, the hydrocarbon distillate can be selected from selected from a refined petroleum product having at minimum 90% aromatic hydrocarbon content with a Kauri-butanol value of 90 or higher.

The hydrocarbon distillate more preferably comprises an aromatic content at least 50% by wt., and more preferably 90% by wt. or more, of condensed aromatics. The hydrocarbon distillate more preferably has a minimum flash point of 150 F, and more preferably, a minimum flash point of 20 F or above. For example, heavy aromatic naphtha is a most preferred hydrocarbon distillate.

It is also possible through use of the present invention to liquefy and disperse heavy organic solids like asphaltenes and maltenes that have previously precipitated and deposited on operating equipment and maintaining the dissolved heavy organic solids in a stable, dispersed manner for extended periods of time. It has been further observed that the compositions of the present invention act to inhibit heavy organic solids deposition/precipitation from the base hydrocarbon fluids into which they are dispersed. In acting as heavy organic solids inhibitor, the preferred compositions of this invention allow for continued petroleum process operations for extended times with less fouling, improved production volumes, and less lost production time and minimized maintenance expense.

More particularly, after treating pipe or equipment, the treated stream containing the composition, the hydrocarbon base liquid and the liquefied heavy organic solids, can be recovered and reintroduced into distillation or other reprocessing to recover the hydrocarbon base liquid. The liquefied heavy organics are removed and treated with any other heavy streams being treated in hydrocarbon refining. For example, the heavy organics may be sent to the coker with other heavy products from the distillation or other processing treatments. The recovered hydrocarbon base liquid can then be reused in diluting the present composition for further, future treatment of fouled equipment. It would be well understood by a person of skill in the art that while the above describes one way of handling the post-treated stream, there could be many other means of handling both the liquefied heavy organics, and the hydrocarbon base fluids that would fall within the scope of the present invention.

An important aspect of this invention is the enhanced rate of dissolution of previously deposited condensed aromatic hydrocarbons such as asphaltenes and bitumen. It is noted that application of the preferred compositions herein described, afford faster and more efficient dissolution of said deposits from fouled operating equipment such as tankage, transfer compartments, piping, crude-bearing formations, distillation fractionators, tubular goods and other such equipment prone to asphaltene fouling.

Due to the improved efficiency of dissolution and cleaning of existing heavy organic solids fouling deposits, previously fouled equipment can be kept clean and absent of deposit accumulation for longer periods of time, since residual deposits are not left behind to act as nucleating sites for seed deposits to form.

In a further preferred embodiment, the composition may further comprise a surface active agent or surfactant to aid in reducing surface tension of the heavy organic solids and help loosen them from the surface of the vessels and equipment to be treated. Preferably the surface active agents have a surface tension in water in the range of less than 50 dynes/cm. The surface active agent is more preferably a non-ionic or anionic surfactant, or a composition thereof.

Further preferably, the surfactant is polyoxyalkylated having a hydrophile-lipophile balance (HLB) number of 9-15 and more preferably between 10 and 12. These are advantageous in that they have been found to not form emulsions or foam.

More preferably, the surfactant is selected from the group of alcohol oxyalkate with 6-10 moles oxide; phenol oxyalkylate with 9-12 mole oxide; oleic acid/polyetheylene glycol adducts; oleoamine oxyalkylates, fatty amine oxyalkylates; urea block copolymers, fumaric/maleic acid polyamine amides; and polyglycol ethers have a molecular weight of between 2000-20,000.

The surfactant concentration in the present composition is preferably within a range of 1.0-10.0% by wt., and more preferably at a concentration of 0.5-2.5% by wt.

EXAMPLES

The following examples are presented to illustrate the advantages of the present invention and are not construed to be limiting of the scope of the invention.

Example 1: Prior Art

Test Conditions: Base Solvent—Aromatic 150 (that is well known in the art as an aromatic solvent with a flash point of 150 F), having 95% aromatics content at minimum
Test Temperature—150 F
Test Duration—30'
Test Deposit—High Mole Weight Asphaltene, Crystalline,
Melting Point—300+ F.
% Asphalt Dissolved—58.2
Rate of Dissolution—8.6% @ 10'
  18.7% @ 15'
  31.9% @ 20'
  45.1% @ 25'
% Precipitation (after 24 hours, no agitation)—88.9

Example 2

Test Conditions: 5 wt. % Preferred Composition (di-substituted 9-decenamide, oxyalkylated dodecyl mercaptan, alkyl aryl sulfonic acid, hydrocarbon distillate, surfactant);
95 wt. % #2 Diesel Oil
Test Temperature—150 F
Test Duration—30'
Test Deposit—High Mole Weight Asphaltene, Crystalline,
Melting Point—300+ F.
% Asphalt Dissolved—97.4%
Rate of Dissolution—27.7% @ 10'
  44.4% @ 15'
  65.2% @ 20'
  88.5% @ 25'
% Precipitation (after 24 hours, no agitation)—0.2

Example 3

Test Conditions: 5 wt. % Preferred Composition (di-substituted 9-decenamide, oxyalkylated dodecyl mercaptan, alkyl aryl sulfonic acid, hydrocarbon distillate; surfactant); 95 wt. % #2 Diesel Oil Test Temperature—150 F
Test Duration—30'
Test Deposit—High Mole Weight Asphaltene, Crystalline,
Melting Point—300+ F
% Asphalt Dissolved—96.6%
Rate of Dissolution—27.2% @ 10'
    48.0% @ 15'
    67.3% @ 20'
    90.1% @ 25'
% Precipitation (after 24 hours, no agitation)—0.4

Evaluation for the efficacy of the preferred embodiment of this invention was performed by establishing standard absorption curves with known amounts of the test debris sample in either #2 diesel oil or Aromatic 150 solvent. Test data was collected at 520 nm wave length using a Hach DR2000 Spectrophotometer. The test absorption data was compared to the known standard values of asphaltenes in untreated hydrocarbon streams to obtain the amount of dissolved asphaltene content. Additionally, aliquots of the test solutions were subject to heptane solubility testing wherein precipitated asphaltenes were weighed after collection and drying.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A composition for chemically liquefying heavy organic solids that are dispersed in hydrocarbon streams, and stabilizing said liquefied solids against precipitation, said composition comprising:
    a. oxyalkylated tertiary dodecyl mercaptan present at a concentration ranging from 1.0-10% by wt. of the composition;
    b. alkylaryl sulfonic acid or its representative salts present at a concentration ranging from 0.5-5.0% by wt. of the composition;
    c. alkyl di-substituted 9-decenamide present at a concentration ranging from 2.0-20.0% by wt. of the composition; and
    d. a hydrocarbon distillate, wherein the composition is diluted in a hydrocarbon base liquid to concentrations of less than 10% composition in hydrocarbon based liquid.

2. The composition of claim 1, wherein the oxyalkylated tertiary dodecyl mercaptan has an oxide adduct ranging from 4-10 moles of ethylene oxide.

3. The composition of claim 1, wherein the alkylaryl sulfonic acid comprises an alkyl group ranging from 8-16 carbon atoms.

4. The composition of claim 3, wherein the alkylaryl sulfonic acid has a form selected from the group consisting of linear and branch form.

5. The composition of claim 4, wherein the alkylaryl sulfonic acid comprises an alkyl group containing 12 carbon atoms.

6. The composition of claim 1, wherein the alkylaryl sulfonic acid is in the form selected from the group consisting of an acid form, a neutralized salt of sodium, a neutralized salt of potassium and a neutralized salt of an amine.

7. The composition of claim 6, wherein the alkylaryl sulfonic acid is in the form of a neutralized salt of isopropylamine.

8. The composition of claim 1, wherein the di-substituted 9-decenamide comprises substitutions selected from the group consisting of dimethyl, dimethyl 1-3 oxo, Cis-9-10 Octa, (Z) Octa, 4-hydroxy-3-methoxyphenyl, 2-methyl-3,8-dioxa.

9. The composition of claim 8, wherein the di-substitution is in the form of dimethyl groups on the terminal nitrogen of the di-substituted 9-decenamide.

10. The composition of claim 8, wherein the di-substituted 9-decenamide is present in the composition in concentrations ranging from 2.0-20.0% by wt.

11. The composition of claim 1, wherein the hydrocarbon distillate is selected from a refined petroleum product having at least 90% aromatic hydrocarbon content with a Kauri-butanol value of 90 or higher.

12. The composition of claim 11, wherein the aromatic content of the hydrocarbon distillate comprises at least 50% condensed aromatics.

13. The composition of claim 12, wherein the aromatic content of the hydrocarbon distillate comprises 80% or more condensed aromatics.

14. The composition of claim 13 wherein the hydrocarbon distillate has a minimum flash point of 150 F.

15. The composition of claim 14, wherein the hydrocarbon distillate has a minimum flash point of 205 F.

16. The composition of claim 1, further comprising a surface active agent having a surface tension in water in the range of less than 50 dynes/cm.

17. The composition of claim 16, wherein the surface active agent is selected from the group consisting of a non-ionic surface active agents, anionic surface active agents and compositions thereof.

18. The composition of claim 17, wherein the surface active agent is polyoxyalkylated having a HLB number of 9-15.

19. The composition of claim 18, wherein the surface active agent has a HLB number of between 10-12.

20. The composition of claim 19, wherein the surface active agent is selected from the group consisting of chosen from alcohol oxyalklate with 6-10 moles oxide; phenol oxyalkylate with 9-12 moles oxide; oleic acid/polyetheylene glycol adducts; oleoamine oxyalkylates, fatty amine oxyalkylates; urea block copolymers, fumaric/maleic acid polyamine amides; and polyglycol ethers have a molecular weight of between 2000-20,000.

21. The composition of claim 20, where in the surface active agent is present in the composition in a concentration range of between 1.0-10.0% by wt.

22. The composition of claim 20, where in the surface active agent is present in the composition in a concentration range of between 0.5-2.5% by wt.

\* \* \* \* \*